United States Patent [19]
Clemence et al.

[11] Patent Number: 4,915,408
[45] Date of Patent: Apr. 10, 1990

[54] COLLAPSIBLE TROLLEYS

[75] Inventors: John W. H. Clemence, Ickenham; Terence L. Dunkley, South Ruislip, both of England

[73] Assignee: Norland Gazelle (Travel Goods) Limited, England

[21] Appl. No.: 257,110

[22] Filed: Oct. 13, 1988

[30] Foreign Application Priority Data

Oct. 15, 1987 [GB] United Kingdom ............... 8724201

[51] Int. Cl.⁴ .............................................. B62B 1/04
[52] U.S. Cl. ............................. 280/655; 280/47.29; 280/47.315; 280/655.1
[58] Field of Search ................ 780/655, 654, 655.1, 780/652, 47.315, 47.371, 47.29, 37, DIG. 3, DIG. 6

[56] References Cited

U.S. PATENT DOCUMENTS

| | | | |
|---|---|---|---|
| 4,037,858 | 7/1977 | Adams | 280/652 |
| 4,335,895 | 6/1982 | Walker | 280/652 |
| 4,426,099 | 1/1984 | Gross | 280/655 |
| 4,478,429 | 10/1984 | Adams | 280/655 |
| 4,506,897 | 3/1985 | Libit | 280/655 |
| 4,684,141 | 8/1987 | Nunokawa | 280/655 |

FOREIGN PATENT DOCUMENTS

| | | | |
|---|---|---|---|
| 2071584 | 9/1981 | United Kingdom | 280/655 |
| 2111917 | 7/1983 | United Kingdom | 280/655 |

Primary Examiner—David M. Mitchell
Attorney, Agent, or Firm—Davis, Bujold & Streck

[57] ABSTRACT

A collapsible luggage cart or trolley has a telescopically-extendable handle which is coupled to a tubular-axle of the trolley wheel-assembly, and which when decoupled from the wheel assembly in the collapsed state of the trolley, is accommodated within the hollow axle of the wheel assembly. A cranked frame of the load-carrying trolley-platform is pivoted on a cross-bar that extends parallel to the axle, and an elastic tie for holding the load on the platform, loops from the extremities of two outwardly-extending side-bars of the platform over an adjustably-positionable hook on the handle. For collapse of the trolley, the cranked frame is swung backwardly to lie over the axle, and the side-bars are folded inwardly with the tie wrapped around the whole. The same sprung latch-pin as used for restraining the handle within a socket on the axle in the erected state of the trolley, is used in the collapsed state for restraining the closed-up handle within the axle.

12 Claims, 6 Drawing Sheets

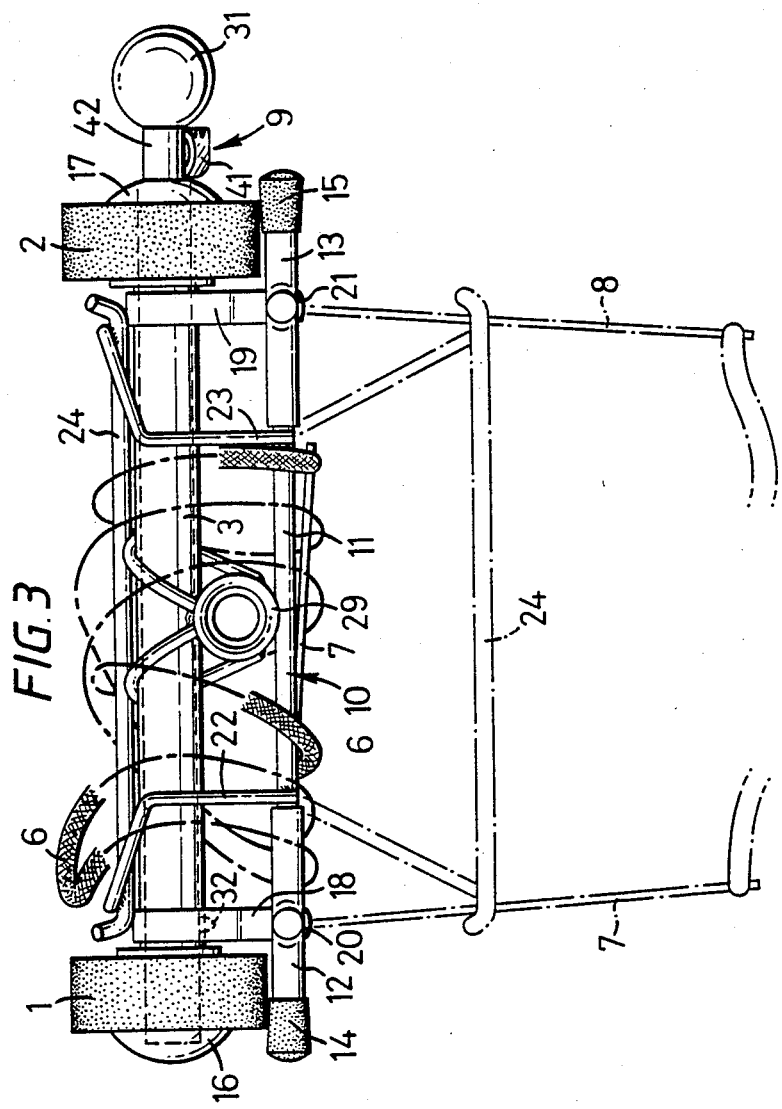

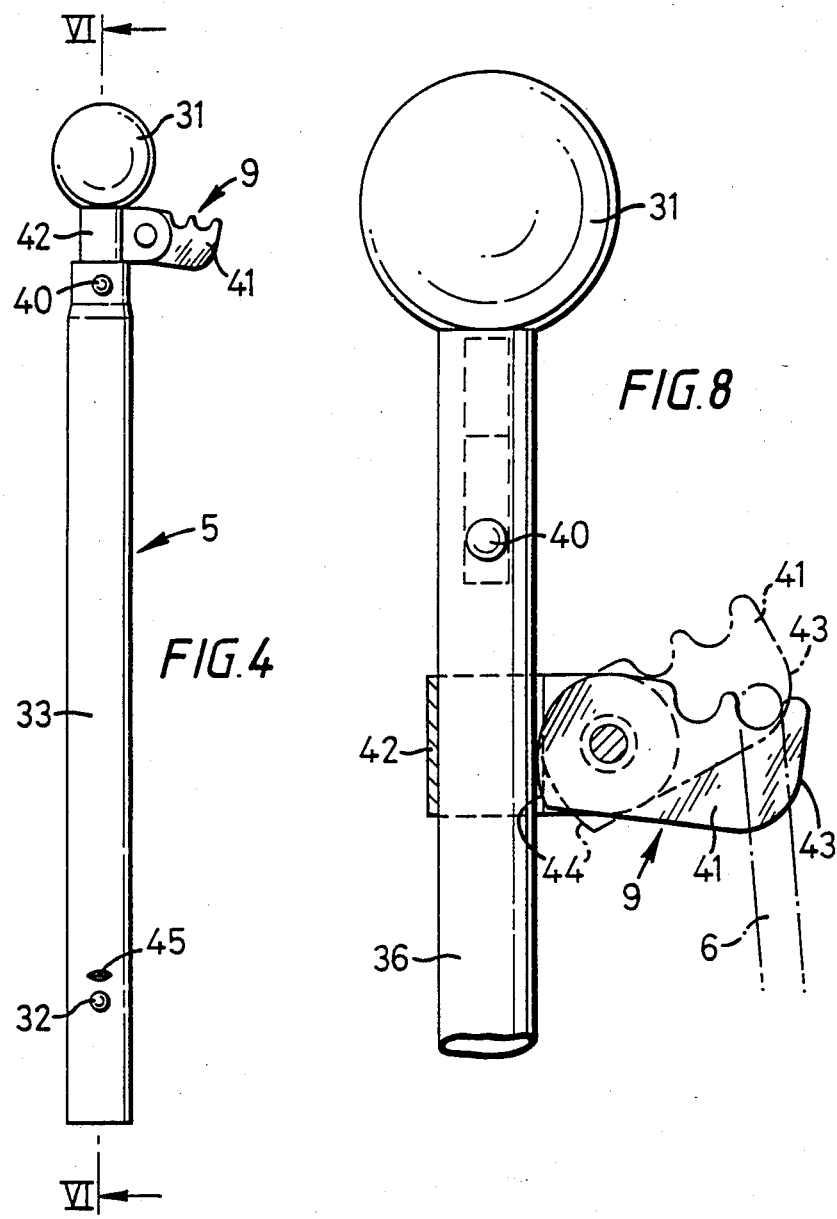

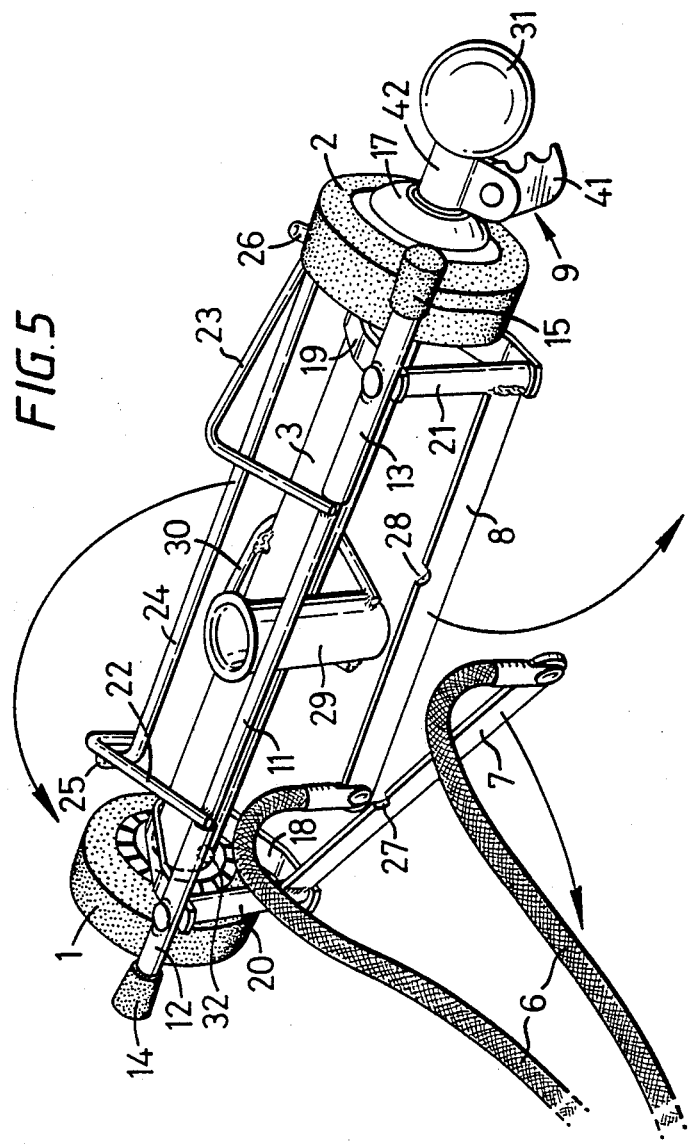

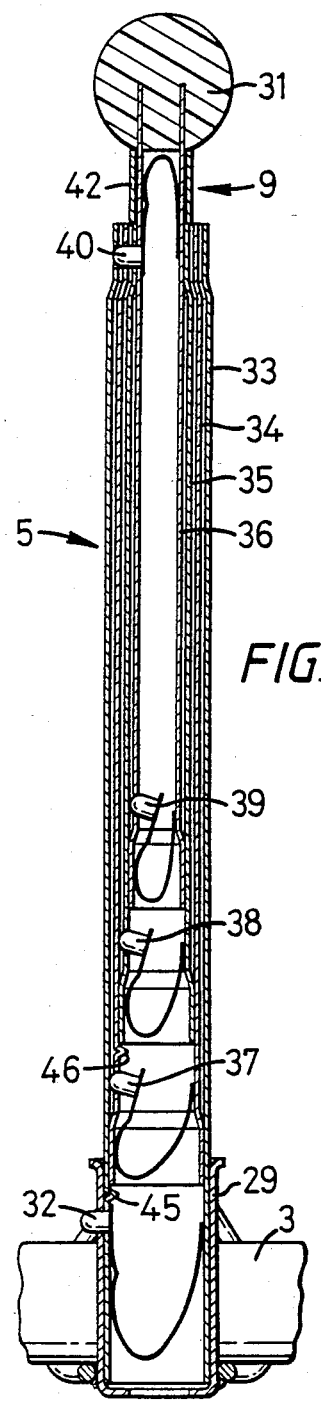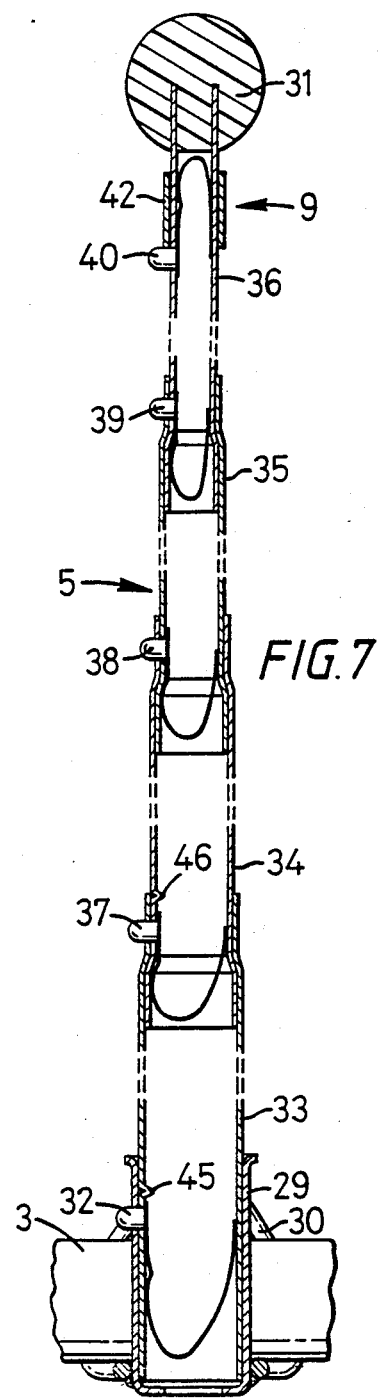

COLLAPSIBLE TROLLEYS

BACKGROUND OF THE INVENTION

The invention is concerned with collapsible trolleys, and in particular, but not exclusively, with trolleys of the kind which are for use in carrying suitcases and other luggage and which when not in use can be collapsed to facilitate carrying and stowing. Collapsible luggage-trolleys of this kind (sometimes referred to as "luggage-carts") are used especially by holidaymakers and other travellers where they would otherwise have to carry their suitcases and other luggage to, and from, airplanes, trains and other forms of public transportation. When the trolley is not being used it is collapsed and is then either carried by the traveller or stowed away in or with the luggage. Accordingly, the trolley is required on the one hand to be sturdy so that it is capable of carrying heavy luggage, and yet on the other hand compact when collapsed so as to enable it to be readily carried and easily stowed when not in use.

OBJECTS OF THE INVENTION

It is one of the objects of the present invention to provide a form of collapsible trolley that enables sturdiness in use and compactness in the collapsed condition, to be readily combined.

It is another object of the present invention to provide such a collapsible trolley that is readily collapsible from the erected condition, and readily erected from the collapsed condition.

A further object of the invention is to provide a collapsible trolley in which the handle by which the erected trolley is manoeuvred, is readily and unobtrusively accommodated in the collapsed-trolley package.

SUMMARY OF THE INVENTION

According to one of the aspects of the present invention, a collapsible trolley is provided wherein the wheel assembly of the trolley is adapted to receive the trolley handle in the collapsed condition of the trolley with the handle extending substantially parallel to the axis of wheel rotation and being contained substantially wholly within the compass of the assembly.

The wheel assembly may involve two wheels mounted on a hollow axle, and in this case the handle may be such that in the collapsed condition of the trolley it can be accommodated within the hollow axle. However, the use of a hollow axle in this way is not of the essence of the invention in that the handle might be accommodated outside the axle but nonetheless within the compass of the assembly; for example, either or both wheels might have one or more openings between rim and hub so as to enable the handle to be inserted into the assembly through one wheel such as to lie, and to be releasably retained, along the axle.

The handle may conveniently be tubular and of a single multi-section telescopic form. A latching device may be incorporated with the handle for use in releasably coupling the handle to the wheel assembly when the trolley is erected for load-carrying use, and also for releasably retaining the handle with the wheel assembly when the trolley is in the collapsed condition.

A load-carrying platform of the trolley may be formed in the erected trolley by components that are mounted pivotably on the wheel assembly, collapse of the trolley involving pivoting of each such component into a position substantially parallel to the rotational axis of the wheels, and/or about a pivotal axis that is substantially parallel to the rotational axis such that the relevant component is brought to lie within, or further within, the space between the wheels in the assembly.

BRIEF DESCRIPTION OF THE DRAWINGS

A collapsible trolley in accordance with the present invention will now be described, by way of example, with reference to the accompanying drawings, in which:

FIG. 3 is a plan view of the trolley, corresponding to that of FIG. 2, but showing the trolley in the collapsed condition and depicting in broken outline components of the load-carrying platform of the trolley when opened out from the collapsed condition during erection of the trolley for use;

FIG. 4 is a side view of the trolley-handle in its collapsed condition;

FIG. 5 is a perspective view of the collapsed trolley as partially opened out during its erection;

FIG. 6 is a longitudinal cross-section of the collapsed trolley-handle as coupled to the wheel assembly of the trolley during erection of the trolley for use, the section of the handle being taken on the line VI—VI of FIG. 4;

FIG. 7 is a longitudinal cross-section corresponding to that of FIG. 6, but with the trolley-handle extended ready for use; and FIG. 8 is an enlarged side view of the upper part of the trolley-handle showing detail of a hook device carried thereby.

The trolley to be described is constructed principally of mild steel, however, it could be constructed to generally the same design in plastics.

DESCRIPTION OF EMBODIMENTS OF THE INVENTION

Figure 1:
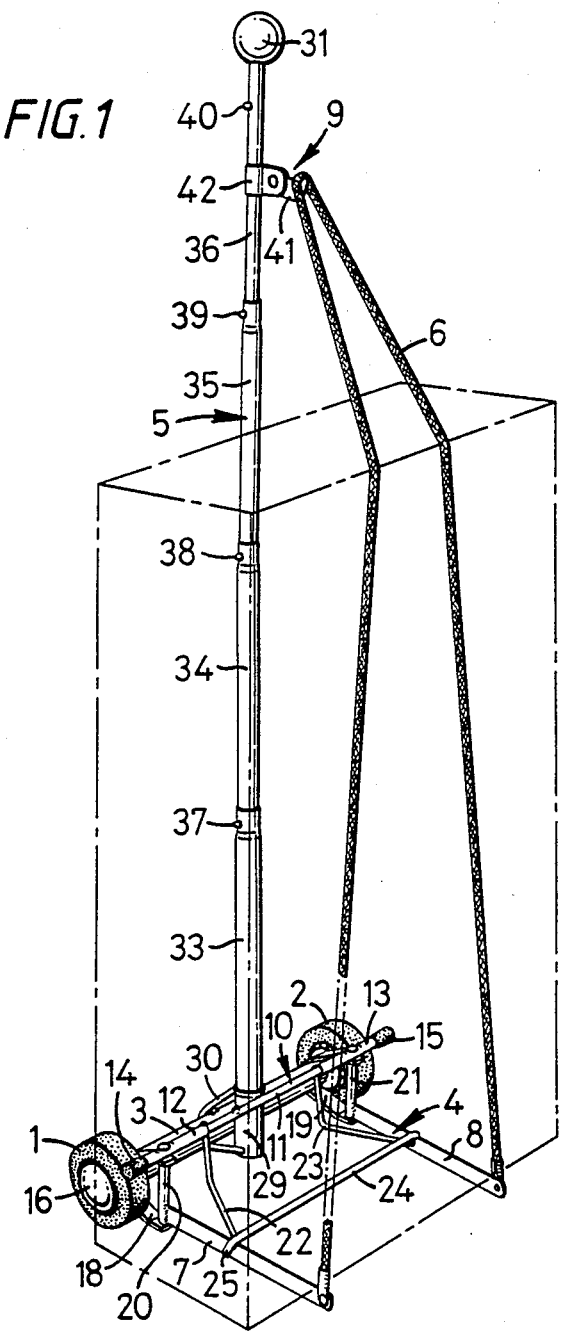
FIG. 1 is a perspective view of the trolley as erected to carry a load (depicted in broken outline)
Figure 2:
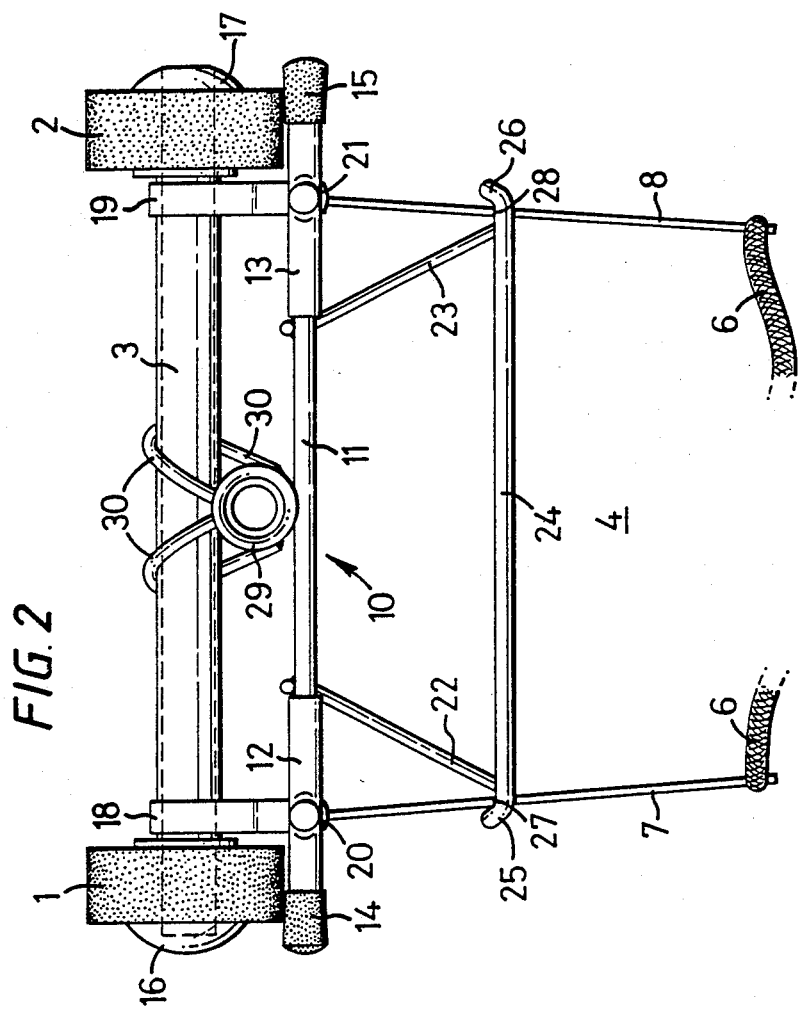
FIG. 2 is a plan view of the erected trolley with its handle removed.

Referring to FIGS. 1 and 2, the trolley has two wheels 1 and 2 of plastics mounted at either end of a tubular axle 3 that supports the load-carrying platform 4 and provides an attachment for the trolley-handle 5. A cotton-covered elastic chord or tie 6 which is anchored at its two ends to the extremities of two side-bars 7 and 8 of the platform 4, is extendable over the platform-load to loop over a hook device 9 on the handle 5. The load is in this way urged resiliently backwards on the platform 4 against both the handle 5 and a cross-bar 10 which extends across the back of the platform 4. The cross-bar 10 is a three-part structure consisting of a central rod 11 which extends into, so as to be rotationally-free but longitudinally-trapped within, two end tubes 12 and 13 that project outwardly over the wheels 1 and 2 respectively. The outer ends of the tubes 12 and 13 are fitted with ferrules 14 and 15 of plastics and serve to keep the load clear of the wheels 1 and 2.

The wheels 1 and 2 rotate freely on the tubular axle 3, being retained between respective hub caps 16 and 17 sprung onto the axle-ends, and respective V-shaped straps 18 and 19 which support the platform 4. Each strap 18 and 19 conforms closely to the surface of the axle 3, and is welded to it, within the apex of the V-shape. The end tubes 12 and 13 are attached to the upper arms of the straps, whereas the side-bars 7 and 8 of the platform 4 are carried by tubes 20 and 21 that are pivotally-mounted between the upper and lower arms of the two straps 18 and 19 respectively. The platform 4 is completed by a frame that consists of two cranked wire-arms 22 and 23 that at one end are welded to the central rod 11 of the cross-bar 10, and a wire cross-piece 24 that is welded to the opposite ends of the two arms 22 and 23 so as to interconnect them. The cross-piece 24 has down-turned extremities 25 and 26 just beyond the welds to the arms 22 and 23, and is sprung-engaged with the two side-bars 7 and 8 in the intervening gaps. The engagement is made with respective notches 27 and 28 in the side-bars 7 and 8, and this traps the side-bars 7 and 8 between the ends of the respective arms 22 and 23 and the adjacent down-turned extremities 25 and 26 of the cross-piece 24. The side-bars 7 and 8 are thereby held rigidly apart so establishing a firm platform-base support for the load from the wheel assembly comprising the two wheels 1 and 2 and interconnecting axle 3.

The trolley handle 5 for manoeuvring the supported load on the wheels 1 and 2, is coupled to a socket 29 that is fixed centrally to the axle 3 by welded wire-straps 30. The handle 5, which is tubular and of multi-section telescopic construction, has a ball-grip 31 at its free end to facilitate manoeuvre of the trolley when it is loaded or is otherwise in use.

When the trolley is not in use, it can be readily collapsed to the elongate, compact form illustrated in FIG. 3. In this condition, the trolley as a whole is to a large extent contained within the compass of the wheel assembly, and may be readily accommodated within its own small carrying-bag (not shown), for example a draw-string bag. Alternatively, the collapsed trolley may conveniently be carried, for example by the ball-grip 31, or it may be easily stowed within a suitcase or other item of luggage.

Referring to FIG. 3, the handle 5 of the trolley in the collapsed condition, is disengaged from the socket 29, and having been closed up on itself telescopically to the form shown in FIG. 4, is accommodated within the tubular axle 3. In this regard, the hub cap 17 has a central aperture that lets into the bore of the tubular axle 3 and enables the whole of the closed-up handle 5 to be received within the hollow axle 3 with just the hook device 9 and ball-grip 31 projecting beyond the wheel 2. The cross-piece 24 also, is disengaged from the side-bars 7 and 8, enabling the frame (22,23,24) to be swung back on the rod 11 in the tubes 12 and 13, to lie over the axle 3. The side-bars 7 and 8, as then pivoted round on the tubes 20 and 21, lie upon one another substantially parallel to the axle 3 beneath the cross-bar 10, and the elastic tie 6 is wound round the whole to complete the compact package.

The trolley can be readily brought into use again by erecting it from the collapsed condition of FIG. 3, through the opening-up stage illustrated in FIG. 5. In this regard, FIG. 5 shows the stage in which the elastic tie 6 has been unwound and the side-bars 7 and 8 are being pivoted outwardly in preparation for swinging the wire frame (22,23,24) back from over the axle 3. Once the side-bars 7 and 8 have been opened out, the frame is brought back over the axle 3 to engage the cross-piece 24 with the notches 27 and 28 in the side-arms 7 and 8; the user completes the engagement by holding the side-bars 7 and 8 in the hands with the wheels 1 and 2 away from the user's body, and then snapping the cross-piece 24 down into the notches 27 and 28 with pressure from the thumbs. Having thus established the platform 4, it is now appropriate to withdraw the closed-up handle 5 from within the axle 3.

The closed-up handle 5 is firmly retained within the axle 3 by means of a sprung latching-pin 32 that is carried at the bottom of the handle 5 (see FIG. 4 especially) and, as shown in FIGS. 3 and 5, projects through a hole in the tubular axle 3 adjacent to the wheel 1. Depression of the pin 32 (by means of the user's thumb) releases the closed-up handle 5 to allow it to be withdrawn fully from the axle 3. The bottom of the withdrawn handle 5 is entered in the socket 29 as illustrated in FIG. 6, with the sprung latching-pin 32 engaging a hole in the wall of the socket 29 to secure the handle 5 firmly to the axle 3.

The handle 5, as illustrated in FIGS. 6 and 7, comprises four telescopically-interfitting tubular sections 33 to 36, with the latching-pin 32 carried, and sprung from, within the largest-diameter, bottom section 33. The other three sections 34 to 36 carry corresponding latching-pins 37 to 39 respectively, with the top, smallest-diameter section 36 also carrying a further latching-pin 40 adjacent the ball-grip 31. None of the pins 37 to 39 is engaged through its respective section 34 to 36 in the closed-up condition (FIGS. 4 and 6), but the pin 40 in this condition engages from the top section 36 through all three other sections 33 to 35. This engagement of the pin 40 serves to hold the handle 5 closed up telescopically at this time.

Opening out of the handle 5 into the fully-extended condition illustrated in FIGS. 1 and 7, is achieved by holding the ball-grip 31 and depressing the pin 40 with the thumb as each successive section 34 to 36 is pulled out. The section 34 (still containing the sections 35 and 36) is pulled out first until the pin 37 latches with the hole in the upper end of the bottom section 33. Depression of the pin 40 then allows the section 35 to be withdrawn until its pin 38 engages the hole in the upper end of the section 34. This is followed by depression of the pin 40 again, to release the section 36, and upon engagement of the pin 39 in the hole at the upper end of the section 35, completes full extension of the handle 5.

The hook device 9 in the closed-up form of the handle 5 is located on the top section 36 between the ball-grip 31 and the pin 40, such device, as illustrated most clearly in FIG. 8, consisting of a hook-arm 41 that is pivoted to a collar-band 42 which runs freely on the top section 36. After the handle 5 has been extended as described above, the pin 40 can be depressed again to allow the collar-band 42 to run down over the pin 40 onto the lower part of the section 36, to whatever height above the platform 4 is appropriate for tensioning the elastic tie 6 over the load. Downward force on the hook-arm 41 from the tensioned tie 6 looped over its outer end 43, pivots the arm 41 to bring its rear, camming end 44 into abutment with the tubular section 36 and thereby hold the hook device 9 tightly in the chosen place. Adjustment of the positioning of the hook device 9 on the section 36 can be readily carried out by relieving the tie-tension acting on the hook-arm 41.

Collapse of the trolley to the condition shown in FIG. 3, can be speedily achieved essentially by reversing the process described above for erecting it from that condition. In particular in this regard, after first depressing the latch-pin 40 to allow the hook device 9 to be re-located immediately beneath the ball-grip 31, collapse of the handle 5 is carried out by closing up the sections 36, 35 and 34, in that order. More especially, the latch-pin 39 is depressed to allow the section 36 to be entered into the section 35 and engage the pin 40 with the hole in the upper end of the section 35. The pin 38 is then depressed to allow the section 35 to be entered into the section 34 and engage the pin 40 also with the hole in the upper end of the section 34, and so on until the four sections 33 to 36 are telescoped together and the pin 40 is engaged from the section 36 into all three sections 33 to 35, as illustrated in FIG. 6.

The handle 5 incorporates a special constructional feature for the purpose of ensuring that the two lower latch-pins 32 and 37 are not displaced during closing up of the four sections 33 to 36. This feature involves the provision of respective indentations 45 and 46 in the sections 33 and 34 just above the latch-pins 32 and 37. The indentation 45 in the section 33 protects against the possibility of the section 34 sliding down inside the section 33 so far that it displaces the latch-pin 32; this could occur if on closing up the section 34 into the section 33 the pin 40 failed (perhaps through misalignment of the sections 33 and 34 rotationally) to latch with the hole in the upper end of the section 33. The indentation 46 in the section 34 correspondingly provides an obstruction preventing the section 35 reaching the latch-pin 37, in the event that the pin 40 does not latch with the hole in the upper end of the section 34, during closing up of the handle 5. No indentation is required in the section 35 because the collar-band 42 under the ball-grip 31 precludes the section 36 from reaching the latch-pin 38.

Although the collar-band 42 is of a diameter that restricts movement of the device 9 to the section 36, this is not essential, and the diameter could be large enough to enable the device 9 to be moved down below the section 36. This would enable a wider range of location of the device 9 in its use for securing the load with the tie 6. In the context of the device 9 also, the hook-arm 41 is conveniently provided with two notches (as illustrated), one to hold the looped-over tie 6, and the other to be available as a hook for supporting, for example, a clothes hanger or hanger-bag.

The trolley may have more than just two wheels 1 and 2. In this respect, a wheel, for example a castor wheel, may be mounted on the extremity of each of the side-bars 7 and 8. Furthermore, it is to be understood that the invention is more widely applicable than just to luggage-trolleys, and that it may be applied to sackbarrows, and to other trolleys having two, or more, wheels used in other contexts, for example, for transportation of groceries or other purchases at markets. The invention is also, for example, applicable to the provision of a collapsible trolley that can be readily stowed in, say, a caravan, boat or automobile, ready for use in carrying heavy and/or awkward items, such as batteries, gas bottles and tired wheels.

Additionally, the handle used need not be as described above. In particular, the ball-grip 31 might be replaced by a grip of other form, but, more generally, the handle itself, instead of having the single, tubular form described above, could have two parallel limbs (of tubular or other construction) which couple to the wheel assembly at their lower ends, and which are interconnected at the top by, for example, a substantially horizontal hand-grip portion. In this latter case, the handle might be accommodated in the collapsed trolley, outside the axle, but nonetheless still generally within the compass of the assembly. More particularly, one (or more) of the wheels may in this respect have openings between its rim and hub to receive the two arms of the handle when they have each been closed up lengthwise. The handle would in this case be releasably retained with the hand-grip portion close upon the wheel and the closed-up arms lying along (for example, diametrically opposed to one another across) the axis of wheel rotation; if the spacing between the two arms exceeds the wheel diameter, then provision may be made for the hand-grip portion to close up telescopically or otherwise, too, in order to reduce that spacing in the collapsed trolley.

We claim:

1. In a collapsible trolley comprising a wheel assembly that includes two wheels mounted spaced apart on a common axis of wheel rotation, and an elongate handle that is detachable from the wheel assembly for collapse of the trolley, the improvement wherein:
   (a) the wheel assembly includes means defining a stowage location for said handle in the collapsed condition of the trolley, said stowage location locating the handle to extend substantially parallel to said axis of wheel rotation, and
   (b) said means includes means defining an entrance aperture for admission of the handle to said stowage location, said aperture being located within the diameter of one of said wheels, and wherein the trolley includes means for releasably retaining the handle stowed in said location.

2. A collapsible trolley according to claim 1 wherein the handle is collapsible telescopically to reduce its length for stowage in said location in the collapsed condition of the trolley.

3. A collapsible trolley according to claim 1 wherein the means for releasably retaining the handle includes a latching device carried at one end of the handle, and wherein the wheel assembly includes a handle-socket for receiving said one end of the handle in erecting the trolley from its collapsed condition, and wherein the latching device engages with the handle-socket in the erected condition of the trolley and is disengageable therefrom to enable the handle to be detached from the handle-socket for collapse of the trolley.

4. A collapsible trolley according to claim 1 wherein a load-carrying platform of the trolley comprises components that are mounted on the wheel assembly to be pivotable between first and second positions, said components in said first position extending outwardly from said axis for load carrying, and in said second position being closed up towards the axis for collapse of the trolley.

5. A collapsible trolley according to claim 1 wherein said aperture is located centrally of the said wheel diameter.

6. In a collapsible trolley comprising a wheel assembly that includes two wheels mounted on an axle to have a common axis of wheel rotation, and an elongate handle that is detachable from the wheel assembly for collapse of the trolley, the improvement wherein the axle is hollow to define an elongate passageway for receiving the handle entered within the axle in the collapsed condition of the trolley, and wherein the trolley includes means for releasably retaining the handle within said passageway when the handle is received as aforesaid within the axle of the wheel assembly.

7. A collapsible trolley comprising a wheel assembly that includes a hollow axle and two wheels mounted on the axle, means for load-carrying carried by the wheel assembly, a handle, and coupling means for engaging the handle with the wheel assembly for manoeuvring the wheel assembly in the erected trolley, said coupling means being selectively operable to disengage the handle from the wheel assembly for collapse of the trolley, and the hollow axle having an entrance aperture through which to receive the handle into the axle for stowage therein when the handle is disengaged from the wheel assembly as aforesaid.

8. A collapsible trolley according to claim 7 wherein the handle is telescopically collapsible to reduce its length in the collapsed trolley for insertion into the hollow axle.

9. A collapsible trolley according to claim 7 wherein the load-carrying means comprises a cranked member for providing at least part of a load-carrying platform of the trolley, and means mounting said cranked member on said assembly for pivotal movement about an axis substantially parallel to said axle and spaced therefrom, said pivotal movement of the cranked member being between a load-carrying position in which the included angle of the crank in said member faces away from the axle and a collapsed position in which said angle faces the axle.

10. A collapsible trolley according to claim 9 wherein the load-carrying means includes side-bars that are each mounted to pivot between a load-carrying position in which the respective side-bar extends outwardly with respect to the axle, and a collapsed position in which the respective side-bar extends substantially parallel to the axle.

11. A collapsible trolley according to claim 10 wherein the load-carrying means includes means for establishing releasable engagement between the cranked member and each of the side-bars when they are each in their load-carrying positions.

12. A collapsible trolley according to claim 7 including means for resiliently latching the handle to the wheel assembly for manoeuvre of the wheel assembly in the erected trolley, and wherein said latching means resiliently latches the handle within the hollow axle in the collapsed condition of the trolley.

* * * * *